United States Patent [19]

Kobayashi

[11] Patent Number: 5,412,514
[45] Date of Patent: May 2, 1995

[54] APPARATUS FOR RECORDING AND/OR REPRODUCING A VIDEO SIGNAL

[75] Inventor: Hiroshi Kobayashi, Chiba, Japan

[73] Assignee: Sony Corporation, Tokyo, Japan

[21] Appl. No.: 133,764

[22] Filed: Oct. 7, 1993

Related U.S. Application Data

[63] Continuation of Ser. No. 737,142, Jul. 29, 1991, abandoned.

[30] Foreign Application Priority Data

Jul. 30, 1990 [JP] Japan .................................. 2-202042
Jul. 30, 1990 [JP] Japan .................................. 2-202051

[51] Int. Cl.$^6$ ............................................. H04N 5/78
[52] U.S. Cl. .................................. 360/35.1; 358/335
[58] Field of Search ...................... 360/35.1, 32, 14.1, 360/8, 9.1, 10.1, 10.3, 27, 72.1, 72.2; 358/335, 337, 906, 909, 310

[56] References Cited

U.S. PATENT DOCUMENTS

| | | | |
|---|---|---|---|
| 4,472,741 | 9/1984 | Takatsu et al. . | |
| 4,646,166 | 2/1987 | Arlan | 358/310 |
| 4,691,253 | 9/1987 | Silver | 358/906 |
| 4,760,469 | 7/1988 | Biber et al. | 360/35.1 |
| 4,772,962 | 9/1988 | Tanaka et al. | 360/35.1 |
| 4,803,554 | 2/1989 | Pape | 358/909 |
| 4,825,301 | 4/1989 | Pape et al. | 358/906 |
| 4,858,032 | 8/1989 | Okada et al. . | |
| 4,870,509 | 9/1989 | Nagasawa et al. | 358/337 |
| 4,914,746 | 4/1990 | Nishi et al. . | |
| 4,939,593 | 7/1990 | Yuuchi et al. | 360/35.1 |
| 5,086,345 | 2/1992 | Nakane et al. | 358/906 |
| 5,130,864 | 7/1992 | Shimada | 360/32 |
| 5,247,399 | 9/1993 | Senba | 360/32 |

FOREIGN PATENT DOCUMENTS

| | | |
|---|---|---|
| 0202009 | 11/1986 | European Pat. Off. . |
| 0253192 | 1/1988 | European Pat. Off. . |
| 0273640 | 7/1988 | European Pat. Off. . |
| 0287376 | 10/1988 | European Pat. Off. . |
| 0336317 | 10/1989 | European Pat. Off. . |

OTHER PUBLICATIONS

Patents Abstracts of Japan vol. 13, No. 53 (E-713) 7 Feb. 1989 & JP-A-63 245 078 (Pioneer Electronic Corp.) 12 Oct. 1988.
Patent Abstracts of Japan, vol. 11, No. 061 (E-483) 25 Feb. 1987 & JP-A-61 220 586 (Sanyo Electric Col., Ltd.) 30 Sep. 1986.

Primary Examiner—David C. Nelms
Assistant Examiner—Que T. Le
Attorney, Agent, or Firm—William S. Frommer; Alvin Sinderbrand

[57] ABSTRACT

In a video signal recording apparatus, a continuous video signal picked-up by a camera is sequentially recorded in a video signal area of a tape as a real moving picture and a frame of the video signal indicated at an arbitrary time is recorded in a digital audio signal area of the tape as a still image signal of high resolution. The real moving picture and the still image can be recorded simultaneously. Still image signals for a plurality of still images picked-up successively at arbitrary times are stored in a video memory and then recorded successively in the digital audio signal area of the tape. Furthermore, an identifying signal is recorded together with each still image signal so that the ending portion of the still image signal can be detected with ease.

16 Claims, 7 Drawing Sheets

| Ye | G  | Ye | G  | Ye |
|----|----|----|----|----|
| Cy | Ye | Cy | Ye | Cy |
| Ye | G  | Ye | G  | Ye |
| Cy | Ye | Cy | Ye | Cy |

228 Tracks
(One Frame Recording of Still Image)

FIG. 8

APPARATUS FOR RECORDING AND/OR REPRODUCING A VIDEO SIGNAL

This application is a continuation of application Ser. No. 07/737,142, filed Jul. 29, 1991, now abandoned.

BACKGROUND OF THE INVENTION

1. Field of the Invention

The present invention generally relates to apparatus for recording and/or reproducing a video signal and, more particularly, is directed to an apparatus for recording and/or reproducing a video signal for use with a video tape recorder having a built-in camera.

2. Description of the Prior Art

As a recording apparatus for recording a still image as an electrical video signal, a so-called electronic still camera has been developed to record a still image on a magnetic disc as a video signal. With this electronic still camera, processing such as development or the like is not required, unlike a standard camera using a halide film. The electronic still camera can reproduced a picked-up still image immediately merely by connecting it to a television receiver.

However, a still image picked-up by such electronic still camera is poor in resolution as compared with a still image picked-up by a standard camera using halide film and therefore it has been proposed that an electronic still camera capable of picking up a still image of high resolution be developed. Since the magnetic disc provided as a recording medium has restrictions on its size and so on, the resolution can not be improved as desired so long as the magnetic disc is utilized.

To obviate the aforementioned problem, an electronic still camera utilizing a semiconductor memory as a recording medium has been developed, in which a video signal of a picked-up still image is converted into a digital signal and the resultant video signal is stored and recorded in the semiconductor memory, thereby obtaining a still image of high resolution. This type of electronic still camera needs a semiconductor memory of large storage capacity and the recording medium becomes very expensive, so that this electronic still camera is utilized only as a professional electronic still camera.

On the other hand, as a consumer video apparatus, a video tape recorder (VTR) is now widely available on the market and it has been suggested that an image of high resolution can be recorded by utilizing this consumer video tape recorder (VTR). In this case, however, it takes a lot of time to record and process a still image of high resolution, and as a consequence, it is impossible to record a plurality of still images which are picked-up successively.

To solve this problem, the assignee of the present application has previously proposed a record and/or reproducing apparatus in which a digital video signal of one field or frame is recorded on a pulse code modulated (PCM) audio data recording portion of a data format of a video tape recorder, such as an 8-mm video tape recorder (see Japanese Patent Application No. 2-46816). In that case, the digital video signal of one field or one frame is recorded in the PCM audio data recording portion of several tens to several hundreds of tracks. Since the digital video signal is recorded as described above, a still image of high resolution can be recorded efficiently.

The digital video signal for one still image is recorded over a plurality of tracks as described above, so that, when a video signal of a new still image is recorded on the tape on which the video signal of the first still image is already recorded, an ending portion of the first recorded video signal must be detected and the video signal of the new still image must begin at this ending portion. If the video signal of the new still image is not positioned as described above, then the new video signal may be recorded on a track in which the video signal of the first still image is already recorded. There is then the problem that the previously-recorded signal is erased unintentionally.

If the ending portion of the first still image signal recorded over several hundreds of tracks is searched for in a normal playback mode, then it takes a large amount of time to detect this ending portion of the first still image signal.

OBJECTS AND SUMMARY OF THE INVENTION

Accordingly, it is an object of the present invention to provide an improved video signal recording and/or reproducing apparatus in which the aforementioned shortcomings and disadvantages encountered with the prior art can be eliminated.

More specifically, it is an object of the present invention to provide an improved video signal recording and/or reproducing apparatus of relatively simple arrangement which can successively record a plurality of still images of high resolution.

It is another object of the present invention to provide a video signal recording and/or reproducing apparatus in which an ending portion of a recorded still image signal can be detected with ease.

As a first aspect of the present invention, a video signal recording apparatus is comprised of means for providing still image data representing a respective still image; memory means for storing the still image data for a plurality of still images and which are sequentially derived from the means for providing still image data at arbitrary times; memory control means for controlling read out of the stored still image data from the memory means; and means for sequentially recording on a record medium the still image data read out from the memory means for the plurality of still images.

In accordance with a second aspect of the present invention, a video signal recording apparatus in which a continuous video signal is recorded in first portions of successive tracks on the recording medium, and the data for each of the still images is derived still images from the continuous video signal at respective arbitrary times and is recorded in second portions of respective groups of tracks along with respective identification signals indicating tracks adjacent an end of the respective group is further comprised of means for detecting said identification signals recorded in tracks of the groups of tracks having respective still image data recorded therein, and control means for causing the recording on the record medium of still image data for a new still image only after detecting of the identification signals identifying the end of the group of tracks in which the still image data was last recorded.

The above and other objects, features and advantages of the present invention will become apparent from the following detailed descriptions of illustrative embodiments thereof to be read in conjunction with the accompanying drawings, in which like reference numerals are used to identify the same or similar parts.

BRIEF DESCRIPTION OF THE DRAWINGS

FIG. 3 is a diagram illustrating how FIGS. 3A and 3B are to be read together.

FIGS. 3A and 3B are parts of a schematic block diagram showing an arrangement of a video signal recording and/or reproducing apparatus according to a first embodiment of the present invention;

DETAILED DESCRIPTION OF THE PREFERRED EMBODIMENTS

The video signal recording and/or reproducing apparatus of the present invention is applied to a video tape recorder which is in accordance with the standard format for an 8-mm video tape recorder, and therefore the standard of this 8-mm video tape recorder will be described initially.

In accordance with this 8-mm video tape recorder standard, signals are recorded and/or reproduced by a pair of rotary heads mounted on a rotary head drum at an angular extent of 180 degrees and a tape is wrapped around the head rotating circumferential surface of the rotary head drum over an angular range of 221 degrees. In an interval of 180 degrees of the angular range of 221 degrees, the video signal is recorded and in another interval of 36 degrees, a digitized (PCM) timebase-compressed audio signal is recorded.

Figure 1:
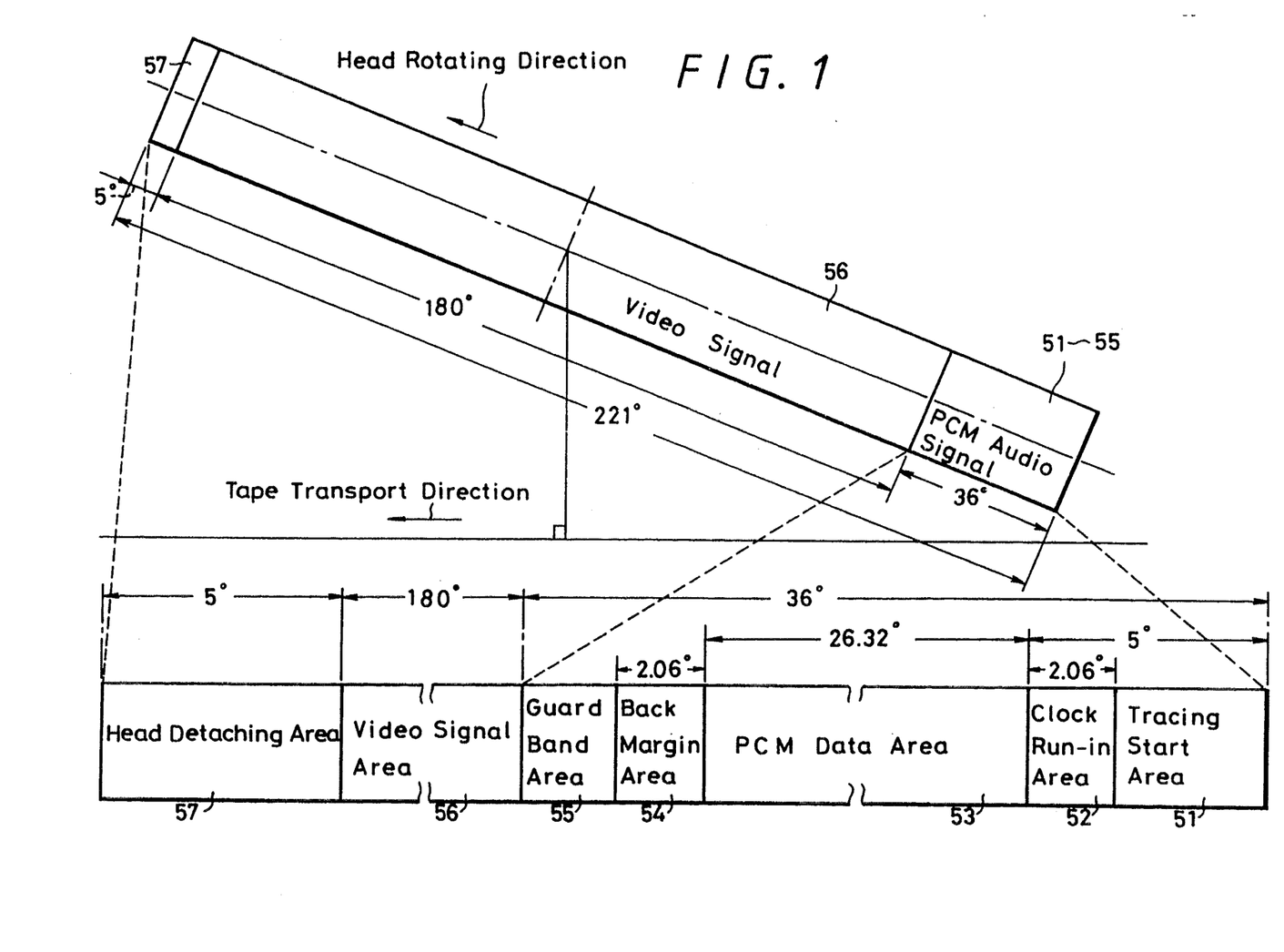
FIGS. 1 and 2 are diagrams of track formats used to explain an 8-mm video tape recorder standard.

FIG. 1 shows an example of a format of a recorded track formed on a tape according to the above-mentioned standard. As shown in FIG. 1, this track format is composed of a PCM audio signal portion having at the head thereof a tracing start area 51 of rotational angle at 2.94 degrees of a head from the right hand side from which the head starts tracing the tape. This tracing start area 51 is followed by a clock run-in area 52 of 2.06 degrees. The 2.06 degrees correspond to three horizontal periods (3 H) of the video signal and this clock run-in area 52 is synchronized with PCM data which will be described later. The clock run-in area 52 is followed by a PCM data area 53 for recording of a timebase-compressed audio signal of 26.32 degrees, and this PCM data area 53 is followed by a back margin area 54 of duration of 2.06 degrees (3 H as earlier noted). This back margin area 54 is used to compensate for the displacement of the recording position or the like in the so-called after-recording mode. The back margin area 54 is followed by a guard band area 55 of 2.62 degrees between a video signal area and the preceding PCM data area. The guard band area 55 is followed by a video signal area 56 of one field of 180 degrees and the video signal area 56 is followed by a head detaching area 57 of 5 degrees.

According to the above-mentioned standard, a video signal of one field is recorded on and/or reproduced from the video signal area 56, while a PCM audio signal of 1/60 second is error-corrected, timebase-compressed, and recorded on and/or reproduced from the PCM data area 53. This recorded track is obliquely formed in the longitudinal direction of the tape sequentially after a preceding track, thereby the consecutive video signal and audio signal being recorded for subsequent reproduction.

In the above-mentioned standard, if the video signal portion of 180 degrees is divided into five equal portions, then one divided video signal portion has 36 degrees. The portions of the audio signal area, namely 26.32 degrees of the PCM data portion 53, 5 degrees of the tracing start area 51 and clock run-in area 52, 2.06 degrees of the succeeding back margin area 54 and 2.62 degrees of the guard band area 55, have a duration of exactly 36 degrees. Accordingly, on the basis of the apparatus according to the above-mentioned standard, it is proposed to construct an apparatus for recording and/or reproducing only an audio signal.

Figure 2:
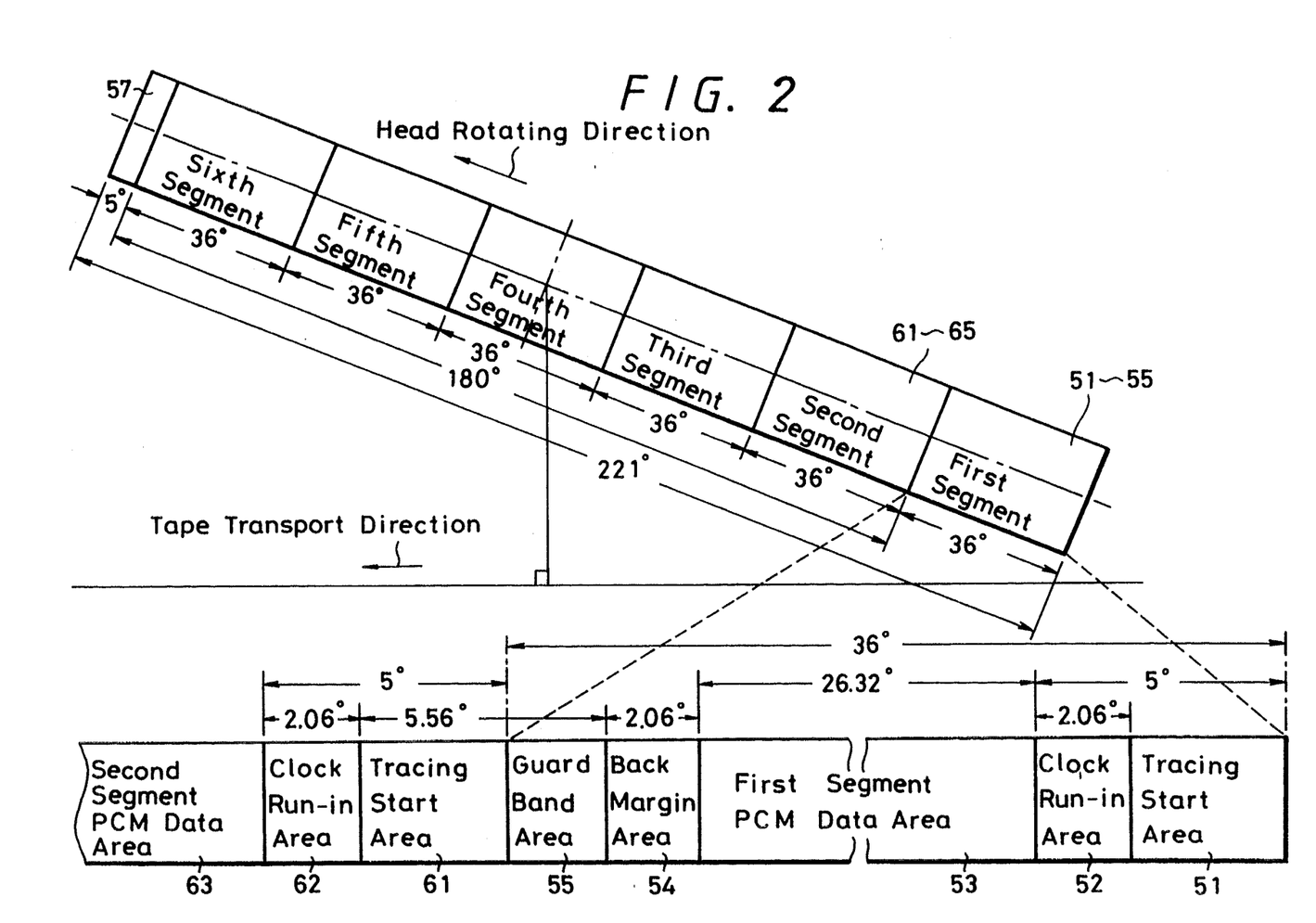

FIG. 2 shows an example of a format of the recording track for each recording and/or reproducing apparatus.

As shown in FIG. 2, the recording track format from the tracing start area 51 in which the head starts tracing the tape to the guard band area 55 is the same as that of the above-mentioned standard and this interval is utilized as the first segment. Then, at the starting portion of the conventional video signal portion 56, the first segment is followed by a tracing start area 61, a clock run-in area 62, a data area 63, a margin area 64 (not shown) and a guard band area 65 (not shown) of the same arrangement, and this interval is utilized as the second segment. Further, the same arrangement as that of the second segment is repeatedly provided at every 36 degrees of the video signal portion 56 and these areas are utilized as third to sixth segments. The sixth segment is followed by the head detaching area 57 of 5 degrees.

Thus, the first to sixth segments are defined. In these segments, the rotational angle position of the rotary head is detected and the PCM data is output thereto and recorded during a time corresponding to a desired segment (interval) of 36 degrees from the head tracing starting point. Then, the reproduced signal is gated during the above time and reproduced, whereby the respective segments can be recorded and/or reproduced independently. If the signal is recorded on a tape that has been used once (in the after-recording mode) and if a flying erase head is driven only during the period in which the head is brought in contact with the tape in the desired segment interval, then only that interval can be selected and erased for re-recording.

In this fashion, a PCM audio signal can be recorded and reproduced in 6 intervals at every width division (track) of the tape, whereby the PCM audio signal can be recorded on and/or reproduced from a tape capable of recording of, for example, 4 hours 30 minutes in a standard format (FIG. 1) or 27 hours in the proposed format (FIG. 2). That is, the proposed recording format yields a recording duration which is 6 times as long as the recording time of the above-mentioned standard format.

Figures 3, 3A:
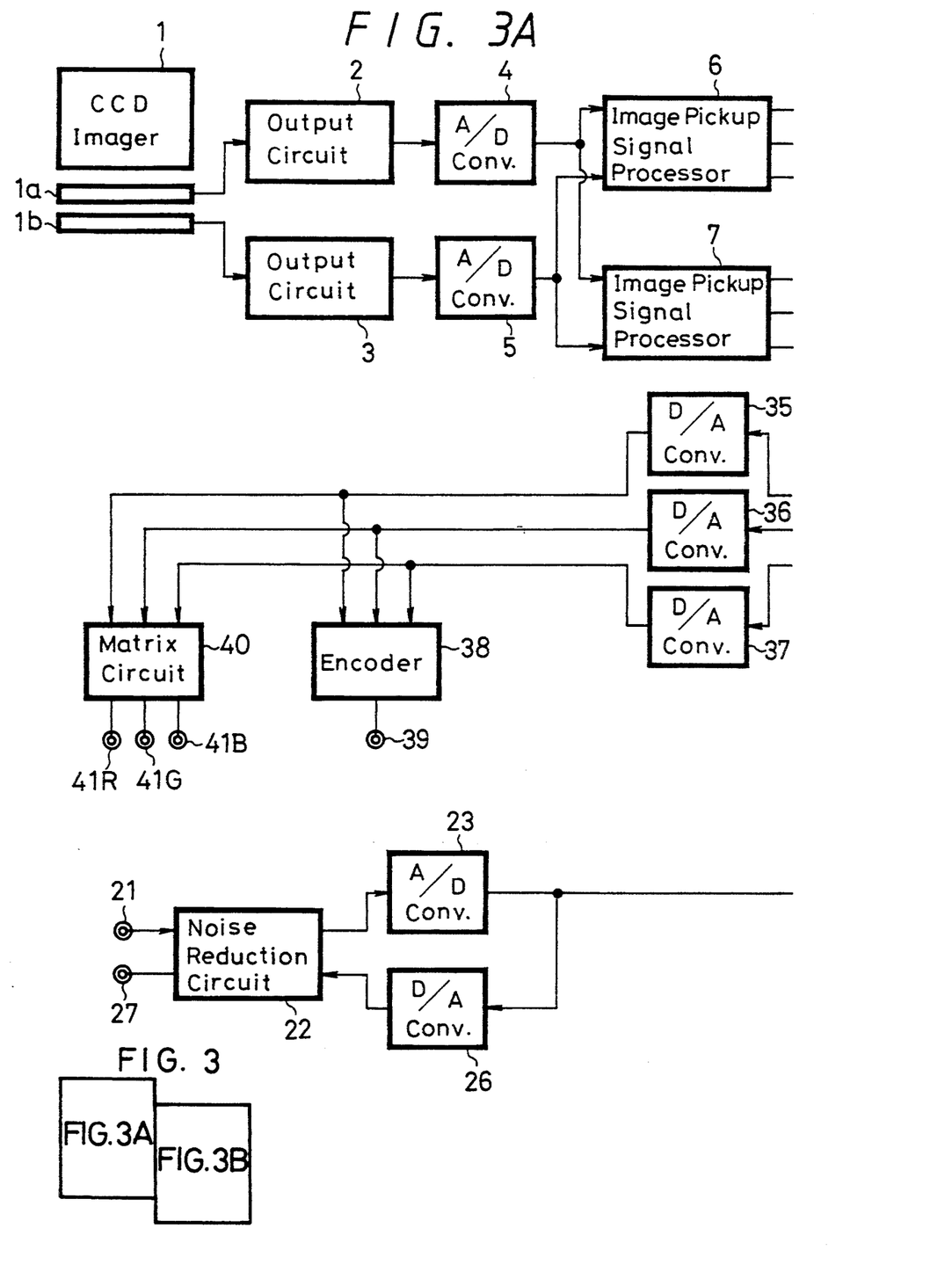
Figure 3B:
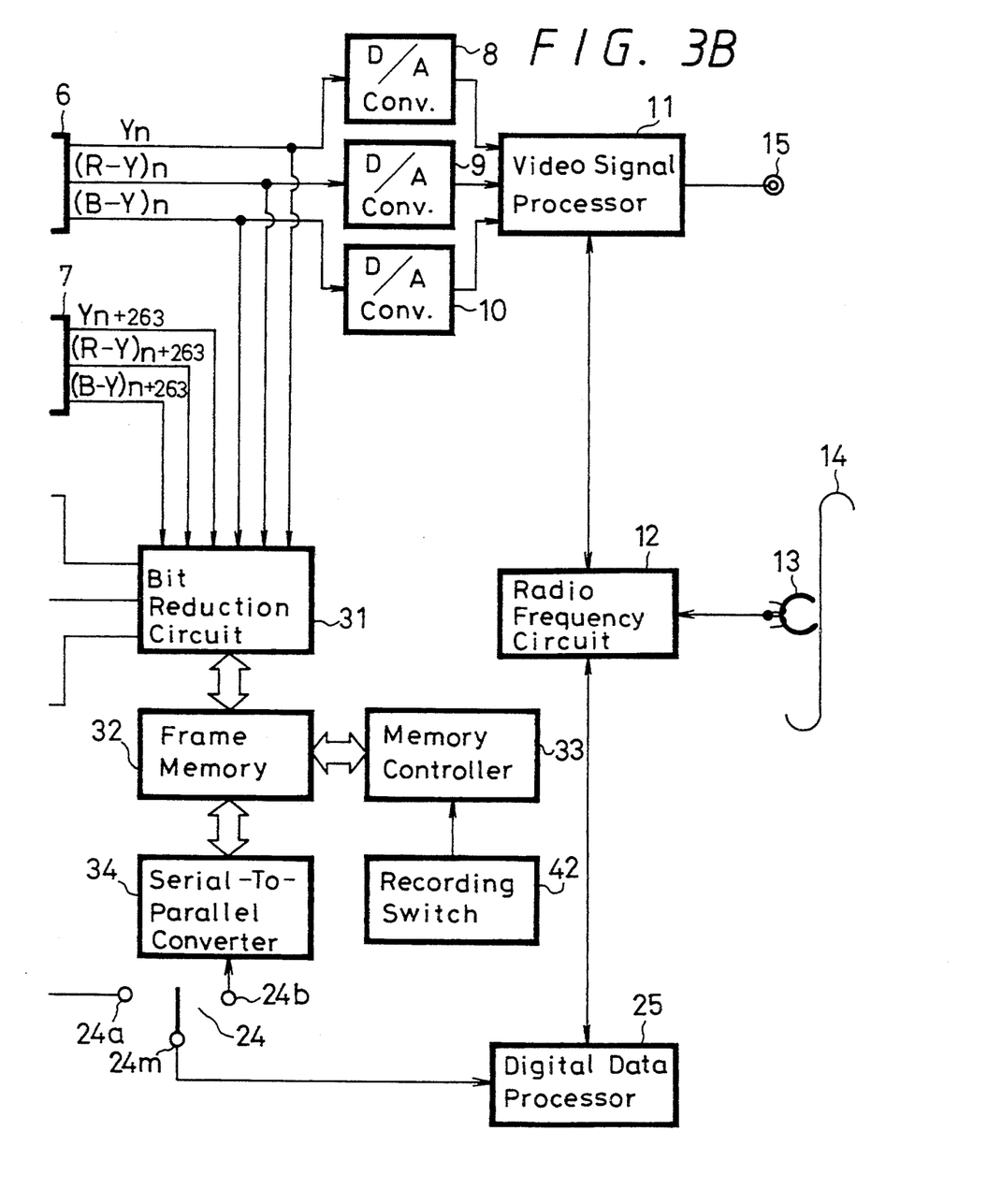

In this embodiment, the present invention is applied to the video tape recorder whose standard conforms to one of the 8-mm video tape recorder standards shown in FIGS. 1 and 2. FIG. 3 shows in block form an example of such 8-mm video tape recorder.

Figure 4:
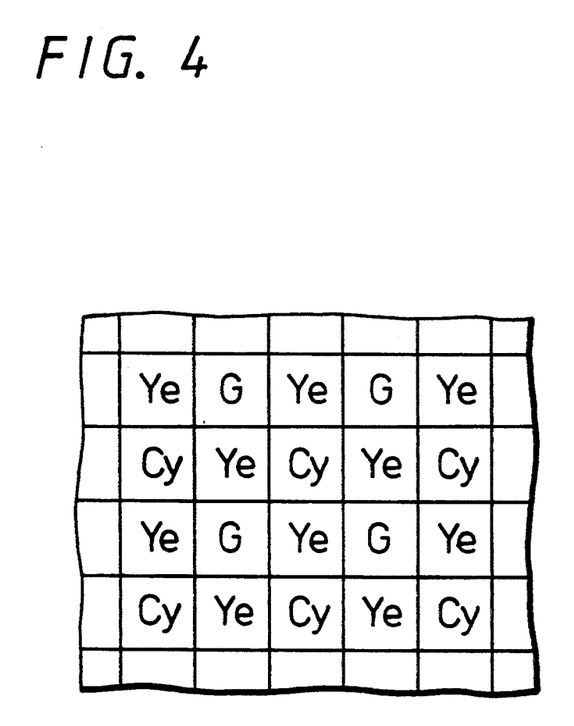
FIG. 4 is a schematic diagram showing an example of a CCD (charge-coupled device) imager used in the present invention.

Referring to FIG. 3, a charge coupled device (CCD) imager 1 is provided as a solid state image pickup element, and this CCD imager 1 is of the so-called full-pixel readout type in which an image signal of pixels of odd-numbered horizontal lines and an image signal of pixels of even-numbered horizontal lines can be read out independently (see Japanese Laid-Open Patent Publication No. 1-188179). The CCD imager 1 of the full-pixel, read-out type includes a color filter array composed of 494 (vertical direction)×768 (horizontal direction) color filters such as a yellow Ye, a green G, a cyan Cy or the like as, for example, shown in FIG. 4. The respective color filters of this color filter array are associated with light receiving elements disposed in front of the CCD imager 1 and signal charges based on the colored light passed through the respective color filters are stored in the respective light receiving elements.

Referring back to FIG. 3, the signal charges stored in the light receiving elements of the odd-numbered horizontal lines and the signal charges stored in the light receiving elements of the even-numbered horizontal lines are output to different shift registers 1a and 1b and outputs of the shift registers 1a and 1b are supplied to output circuits 2 and 3, respectively. In the output circuits 2 and 3, these signals are sampled and held and video signals from the output circuits 2 and 3 are supplied to analog-to-digital (A/D) converters 4 and 5, in which they are converted into digital video signals, respectively. The digital video signals from the A/D converters 4 and 5 are supplied to each of video signal processing circuits 6 and 7 and these video signal processing circuits 6 and 7 each extract luminance component and color difference component signals from the video signals supplied thereto. In this case, assuming that n is the number of horizontal lines of the video signal, then the video signal processing circuit 6 extracts a luminance signal component $Y_n$ and color difference signals $(R-Y)_n$, $(B-Y)_n$ and the video signal processing circuit 7 extracts a luminance component $Y_{n+}$ and color difference signals $(R-Y)_{n+263}$ and $(B-Y)_{n+263}$, respectively. That is, the video signal processing circuits 6 and 7 simultaneously derive signals which are displaced in time by 263 horizontal lines which correspond to one field. As a consequence, when the video signal processing circuit 6 derives the luminance component and the color difference components of the video signal for each line of an odd-numbered field, the video signal processing circuit 7 derives the luminance component and the color difference components of the video signal for each line of a next even-numbered field. Conversely, when the video signal processing circuit 6 derives the luminance component and the color difference components of the video signal of an even-numbered field, the video signal processing circuit 7 derives the luminance component and the color difference components of the video signal of a next odd-numbered field.

Then, the outputs $Y_n$, $(R-Y)_n$ and $(B-Y)_n$ from the video signal processing circuit 6 are respectively supplied to digital-to-analog (D/A) converters 8, 9 and 10, in which they are converted into analog signals and then fed to a video signal processing circuit 11. In the video signal processing circuit 11, the video signal supplied thereto as a luminance component and color difference components is converted into a video signal of the predetermined recording standard. This video signal is supplied through a radio frequency (RF) circuit 12 to a magnetic head 13 mounted on a rotary head drum, and recorded on the video signal area 56 of a track formed on a video tape 14 according to the standard shown in FIG. 1. In this case, a video signal of one field is recorded on each track.

Further, a video signal reproduced from the video tape 14 by the magnetic head 13 is supplied through the RF circuit 12 to the video signal processing circuit 11 and a reproduced video signal from the video signal processing circuit 11 is supplied to an output terminal 15.

In this embodiment, an audio signal picked-up by a microphone (not shown) is supplied through an input terminal 21 to a noise reduction circuit 22, in which it undergoes noise reduction processing. Then, the audio signal from the noise reduction circuit 22 is supplied to an A/D converter 23 and converted to a digital audio signal. The digital audio signal from the A/D converter 23 is supplied to a first fixed contact 24a of a change-over switch 24. The change-over switch 24 connects its movable contact 24m to the first fixed contact 24a when the digital audio signal is recorded and/or reproduced. A signal developed at the movable contact 24m is supplied to a digital data processing circuit 25. This signal is then processed by the digital data processing circuit 25 in a predetermined processing fashion such as the addition of an error correcting code or the like and supplied through the RF circuit 12 to the magnetic head 13, and recorded on the PCM data area 53 of the standard format shown in FIG. 1 which is formed on the video tape 14.

The digital audio signal reproduced from the video tape 14 by the magnetic head 13 is supplied through the RF circuit 12 to the digital data processing circuit 25. This reproduced digital audio signal is error-corrected in the digital data processing circuit 25 and supplied through the change-over switch 24 to a D/A converter 26. This digital audio signal is converted into an analog audio signal by the D/A converter 26 and undergoes noise reduction processing by noise reduction circuit 22. The thus processed audio signal is delivered to an output terminal 27. Though not shown, the audio signal is frequency multiplexed with an FM-modulated video signal and a digital audio signal may optionally be recorded.

In this embodiment, instead of the digital audio signal, a digital video signal of a still image can be recorded in the PCM data area 53 (see FIG. 1) in which the digital audio signal is recorded. This kind of apparatus for recording a digital video signal has been previously proposed by the assignee of the present application (see Japanese Patent Application No. 2-46816).

Referring to FIG. 3, when the video signal recording and/or reproducing apparatus is in the recording mode for a still image, the luminance components and the color difference components (digital signals) of the video signals from the video signal processing circuits 6 and 7 are supplied to the bit reduction circuit 31, in which they are compressed to several tenths of their original number of bits and are then supplied to and written in a plural frame memory 32, hereinafter referred to as the frame memory 32, at a predetermined write timing. The luminance component Y and the color difference components (R-Y) and (B-Y) are written in the frame memory 32 independently. In this case, the frame memory 32 has a storage capacity sufficient for storing a video signal of 3 frames, corresponding to three still images. The write and read operations for frame memory 32 are controlled by a memory controller 33 so that, each time a still image recording switch 42 of the video camera is depressed, a video signal of one frame is stored in the frame memory 32. Consequently, when the still image recording switch 42 is depressed successively, then a video signal provided by three depressions of the still image recording switch 42, i.e., a video signal of at most three frames, is stored in the frame memory 32.

The video signals displaced by one field are output from the video signal processing circuits 6 and 7; added and then merged into a video signal of one frame and written in the frame memory 32. Further, in the bit reduction circuit 31, only the number of bits is reduced but the information content of the video signal is not changed.

A video signal of one frame temporarily stored in the frame memory 32 is read out therefrom at a relatively slow transmission rate, conforming to the transmission rate of the above-mentioned audio signal, under the control of a memory controller 33 and then fed to parallel-to-serial converting circuit 34, in which it is converted into serial data. The serial data from the parallel-to-serial converting circuit 34 is supplied to a second fixed contact 24b of the change-over switch 24. In this embodiment, as mentioned, up to three frames of a digital video signal of the still image can be stored in the frame memory 32. When a video signal of 2 frames or 3 frames is stored in the frame memory 32, under the control of the memory controller 33, the video signals are read out from the frame memory 32 at the relatively slow transmission rate conforming to the transmission rate of the digital audio signal in the sequential order of the old video signal.

While the video signal is read out from the frame memory 32, the movable contact 24m of the change-over switch 24 is connected to the second fixed contact 24b and the serial data from the parallel-to-serial converting circuit 34 is supplied to the digital data processing circuit 25. In the digital data processing circuit 25, this serial data is processed by addition of an error-correcting code or the like similarly to the recording mode of the digital audio signal and then fed through the RF circuit 12 to the magnetic head 13, whereby the video signal of one frame is recorded on the video tape 14 in its PCM data area 53 according to the standard shown in FIG. 1 as the still image signal.

In this case, since the PCM data area 53 of one track has small capacity relative to the capacity required to record a field of a video signal, the video signal of one field is recorded on a group of tracks. For example, let it be assumed that the digital audio signal is recorded on the PCM data area 53 of one track at a transmission rate of 500 kBPS (i.e., 500 kbits per second) and also that the video signal of one frame produced from the video signal processing circuits 6 and 7 has 7.6 Mbits including the luminance component and the color difference components. Then, when the digital signal is compressed to ¼ of its original number of bits by the bit reduction circuit 31, the frame memory 32 stores 1.9 Mbits as the video signal of one frame. If the signal of 1.9 Mbits is recorded at the transmission rate of 500 kBPS, then $1900 \div 500 = 3.8$ and therefore the video signal of one frame is recorded on a plurality of the PCM data areas 53 in 3.8 seconds. The duration of time of 3.8 seconds corresponds to a group of 228 tracks.

As mentioned, in this embodiment, the frame memory 32 can store a video signal of three frames. Thus, when a video signal of, for example, 3 frames is recorded in the frame memory 32, the video signal can be read out from this frame memory 32 during a period of $3.8 \times 3 = 11.4$ seconds.

When the video signal of one frame which has been recorded on the PCM data area 53 of each of a plurality of tracks as the still image signal is reproduced, then the digital video signal reproduced from the video tape 14 by the magnetic head 13 is supplied through the RF circuit 12 to the digital data processing circuit 25. The digital video signal, after being error-corrected by the digital data processing circuit 25, is then supplied through the change-over switch 24 to the serial-to-parallel converting circuit 34 and parallel data is written in the frame memory 32 under the control of the memory controller 33.

At that point, the video signal of one frame is reproduced from the video tape 14 during the same duration of time (e.g., 3.8 seconds) as that required in the recording mode.

When the video signal of one frame is written in the frame memory 32, then the video signal is read out to the bit reduction circuit 31 from the frame memory 32 under the control of the memory controller 33 and then reconverted into the digital signal of the original number of bits by the bit reduction circuit 31. At that time, the video signals for 2 fields constituting the video signal of one frame are alternately read out of the frame memory 32 in a real time fashion, that is, the video signal of one frame is repeatedly read out from the frame memory 32 at the cycle of one-thirtieth of a second. Then the luminance signal Y and the color difference signals (R-Y) and (B-Y) of the reconverted video signal are respectively supplied to the D/A converters 35, 36 and 37 and converted into an analog luminance signal and color difference signals by the D/A converters 35, 36 and 37, respectively. The analog luminance signal and color difference signals are supplied to an encoder 38, in which they are converted into a composite video signal, and this composite video signal is supplied through an output terminal 39 to a monitor receiver (not shown) or the like. Also, the analog luminance signals and analog color difference signals from the D/A converters 35, 36 and 37 are supplied to a matrix circuit 40, in which they are converted into three primary color signals R, G and B. These primary color signals R, G and B are supplied through output terminals 41R, 41G and 41B to a monitor receiver (not shown) or the like.

Since the video tape recorder of this embodiment is arranged as described above, a still image of high resolution can be recorded as a digital signal. That is, when the apparatus of this embodiment is in the recording mode for a still image, the digital audio signal is not recorded on the PCM data area 53 of each track but instead, the video signal of one frame digitized at an arbitrary time can be recorded. In that case, if the video camera, for example, is provided with the still image recording switch 42 and if this still image recording switch 42 is depressed while the continuous analog video signal is being recorded on the video signal area 56 of each track, then the frame of the continuous analog video signal provided at the instant this switch 42 is depressed is recorded as a digital signal of a still image.

Figure 5:
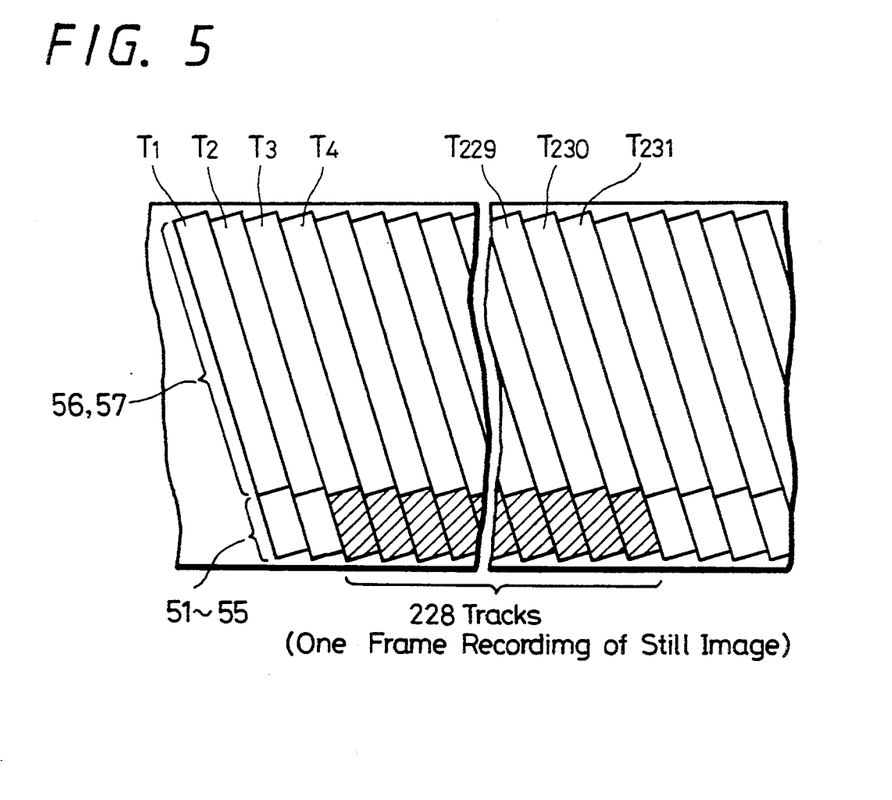
FIG. 5 is a schematic diagram of recorded tracks used in explaining the operation of the first embodiment of the present invention.

Let it now be assumed that, as for example, shown in FIG. 5, respective tracks $T_1$, $T_2$, $T_3$, . . . , are sequentially formed on the video tape during recording of the normal analog video signal and that the still image recording switch 42 is operated at the time in which recording is performed on the track $T_3$. Then, the recording of the same frame of the digital video signal as is recorded as the analog video signal on the video signal area 56 of the track $T_3$ is started in the PCM data portion 53. It is to be appreciated that the digital signal recording commences after a delay time of several tracks due to the processing speed of the circuit. In this case, the video signal of one frame is recorded on the PCM data area 53 over 228 tracks up to the track $T_{230}$ as shown by the hatched portion in FIG. 5, and the recording of the next still image digitized again at an arbitrary time may start after the next track $T_{231}$.

Figure 6:
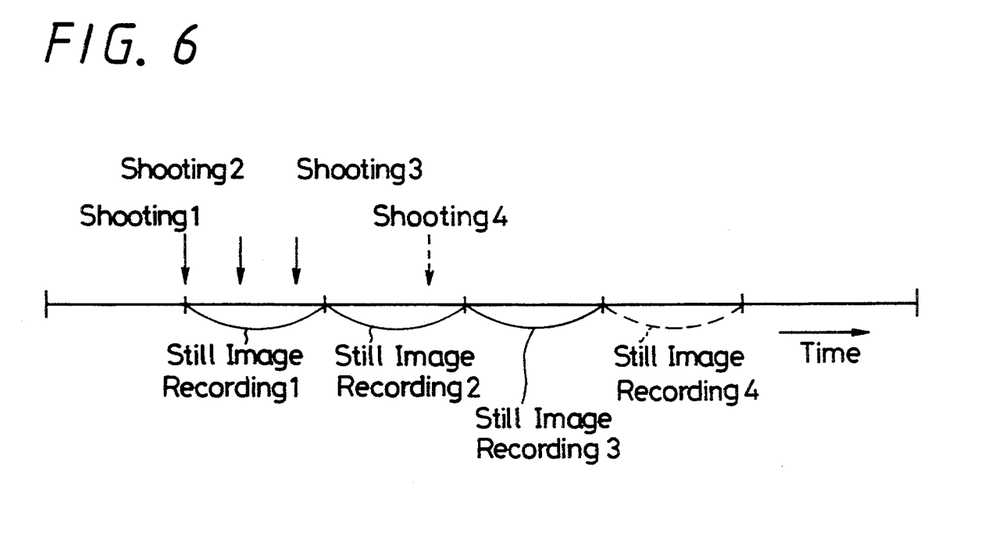
FIG. 6 is a schematic diagram used to explain a recording timing of the first embodiment of the present invention.

In this embodiment, since a video signal of three frames can be stored in the frame memory 32, the successively-digitized still images can be recorded on 684 tracks (228 tracks×3) when the still image is picked-up at three successive times. That is, as shown in FIG. 6, assuming that the still image recording switch 42 is depressed at a certain time to perform the still image shooting 1, then the video signal derived from the CCD imager 1 is written in the frame memory 32 and the recording which will continue over the next 228 tracks on the PCM data area 53 of the video tape 14 is started (still image recording 1). If the still image recording switch 42 is depressed two more times to perform the still image shootings 2 and 3 before the recording over 228 tracks on the PCM data area 53 is ended, then the frame of the video signal derived from the CCD imager 1 at the respective times of the shootings 2 and 3 is written in the frame memory 32. Then, when the still image recording 1 is ended, the video signal written in the frame memory 32 at the shooting 2 is read out therefrom and recorded on the video tape 14 (still image recording 2). Further, when this still image recording 2 is finished, then the video signal written in the frame memory 32 at the shooting 3 is read out therefrom and recorded on the video tape 14 (still image recording 3).

In this case, at the timing point in which the recording of the respective video signals on the video tape 14 is finished and the frame memory 32 becomes empty, the next still image can be picked-up. For example, when the still image recording switch 42 is depressed while the still image recording 2 is carried out, (i.e., a shooting 4 in FIG. 6), the resultant video signal is written in the frame memory 32 at the address utilized for the shooting 1 and then recorded on the video tape 14 after the still image recording 3 is finished (still image recording 4).

Since the still image thus recorded is a high resolution digitized audio signal of one frame, the output of the CCD imager 1 is recorded without substantial deterioration. Thus, a still image of high resolution can be recorded as compared with the prior art such as when a still image is reproduced on the basis of the analog video signal of each field recorded on the video signal area 56 or when an analog video signal of one field is recorded by the conventional electronic still camera. If the reproduced signal of this still image is supplied to a video printer, then a hard copy of the still image of high resolution can be obtained. In this case, since the digital video signal is recorded by effectively utilizing the area in which the PCM audio signal of a video camera according to the 8-mm video tape recorder standard is recorded, the digital video signal can be recorded by adding only a few circuits such as a frame memory or the like and therefore the recording and/or reproducing apparatus can be simplified in arrangement. Further since a sub area of the video tape, which is not utilized for recording the video signal as it is designed, is utilized, efficient recording can be effected.

In this embodiment, since the field memory 32 for the still image recording is arranged so as to store a video signal of three frames, the video signal which results from successively shooting three still images can be recorded so that these still images can be continuously picked-up similarly to the standard still camera, although recording of the first still image may not yet be completed.

When the still image recording switch 42 is successively depressed more than three times in a very short period of time, all still images cannot be recorded because the quantity of video signals to be stored exceeds the storage capacity of the frame memory 32, which fact may be displayed on a viewfinder or the like.

Further, since the digital video signal is compressed in number of bits by the bit reduction circuit 31 and then recorded on video tape 14, the data amount of one field is small and the still image can be efficiently recorded in a relatively short period of time. Alternatively, the above bit reduction may be performed by the frame memory 32.

While the analog video signal is continuously recorded as a real moving picture, the digital video signal is also recorded as a still image, as described above, but when only a digital video signal is to be recorded as a still image, a dummy video signal (e.g., a signal having no video information and which is composed of only a synchronizing signal) is recorded on the video signal area 56 of the video tape 14.

Figure 7:
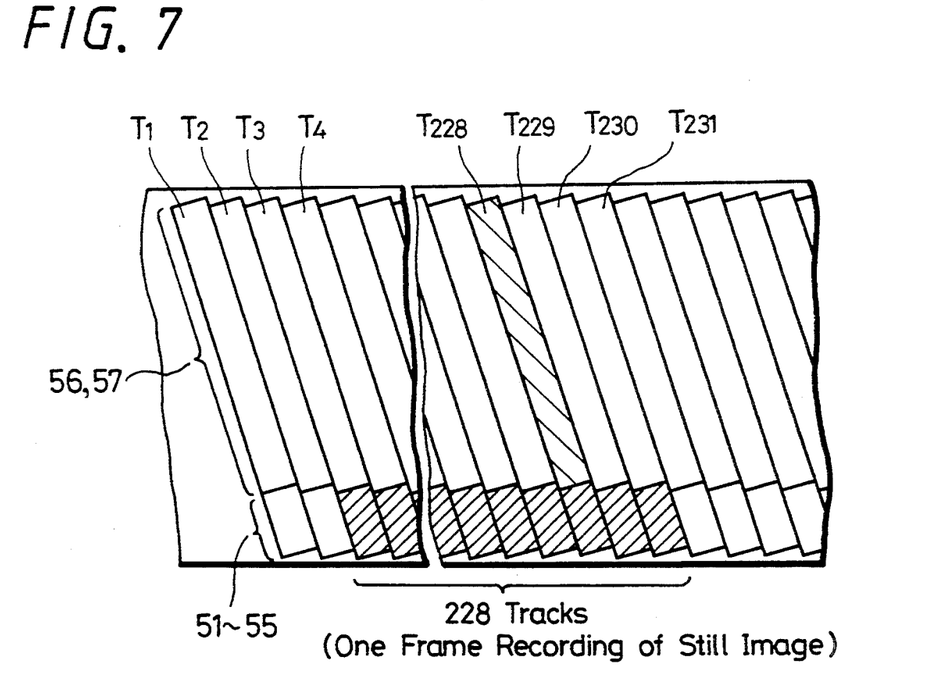
FIG. 7 is a schematic diagram of recorded tracks according to a modified example of the present invention.

In this case, if continuous still image shooting exceeding the storage capacity of the field memory 32 is performed, then an analog video signal may be recorded on the video signal area 56. As an example, if the still image recording switch 42 is continuously depressed four times within, for example, 3.8 seconds, then the video signal is recorded in the field memory 32 for one frame at each of the first three frames at which the still image recording switch 42 is depressed and then sequentially recorded in a plurality of the PCM data areas 53. However, when the still image recording switch 42 is depressed last, i.e., the fourth time, the storage capacity of the field memory 32 is fully occupied. If at the fourth depression, an analog video signal of one field or one frame is written in the video signal area 56 by utilizing a recording system circuit of the standard real moving picture, then the fourth still image can be recorded although its resolution is deteriorated. For example, when a digital video signal is recorded on the PCM data area 53 of the tracks $T_3$ to $T_{230}$ while the storage capacity of the field memory 32 is fully occupied as shown in FIG. 7 and when the still image recording switch 42 is depressed just before the digital video signal is recorded on the track $T_{228}$, then one field of the analog video signal that is then picked-up is recorded on the video signal area 56 of the track $T_{228}$. At that time, special ID (identifying) data is recorded on the PCM data area 53 of the track T228 so that the still image based on this analog recording can be searched for with ease.

Alternatively, by utilizing the multi-segment PCM standard of the 8-mm video tape recorder shown in FIG. 2, only digital video signals representing still images can be recorded. In this case, the 1st and 6th segments may be utilized as separate channels in which the still images are recorded independently, or alternatively, a digital video signal of one frame may be recorded in a shorter period of time by sequentially utilizing the 1st to 6th segments.

Since the CCD imager 1 which can derive a video signal of all the pixels of one frame during one field period is utilized as the image pickup means of the video camera in the above embodiment, a video signal of one frame can be obtained with ease and then digitized and recorded. If an image pickup means which can derive only an imager signal of one field is utilized, a video signal of only one field may be recorded as the still image signal. In this case, since the memory 32 has a storage capacity of 3 frames (6 fields), six still images can be recorded and the continuous still image shooting of up to six still images can be effected.

In the case of field recording, the vertical resolution of such a recorded video signal is lowered to one half of that of a recorded video signal in the case of frame recording.

While a memory which can store video signals of 3 frames is utilized as the memory 32 for the still image recording, continuous still image shooting can be effected if the memory has a storage capacity of at least two still pictures. It is also possible that a memory storage capacity of more than 3 frames can be utilized.

Further, while the video signal picked-up by the video camera is recorded as the digital video signal, a variant is also possible in which a video signal of one frame or one field supplied from other video apparatus such as a video tape recorder or the like can be recorded.

According to the above embodiment of the present invention, a video signal of a still image is simultaneously recorded with a video signal of a real moving picture and the still image can be recorded efficiently by the above described simplified arrangement. In this case, the still images successively picked-up can be recorded and the still images can be picked-up successively at arbitrary times.

Another embodiment of the present invention will be described below and in this case, a video signal of one frame is assumed to be recorded over 228 tracks.

Figure 8:
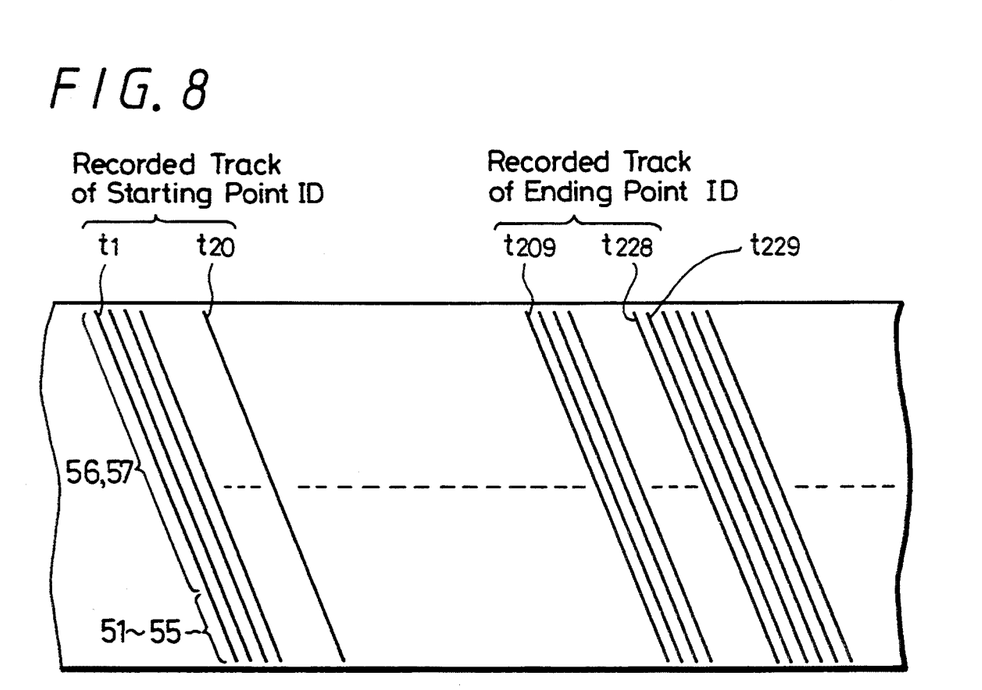
FIG. 8 is a schematic diagram of recorded tracks according to a second embodiment of the present invention.

In this embodiment, of the 228 tracks constituting the video signal of one frame, an ID signal (hereinafter referred to as a start point ID) indicative of the starting point is recorded on the initial 20 tracks and an ID signal (hereinafter referred to as an end point ID) indicative of the ending point is recorded on the last 20 tracks.

More specifically, as shown in FIG. 8, if the video signal of one frame is recorded on the PCM data area 53 in a range of from track $t_1$ to track $t_{228}$, the start point ID is recorded on the first 20 tracks ranging from tracks $t_1$ to $t_{20}$ and the end point ID is recorded on the last 20 tracks from tracks $t_{209}$ to $t_{228}$.

The reason that the start point ID and the end point ID are each recorded on each of 20 tracks is to facilitate detection of these IDs in a high speed search mode (fast forward mode with a tape speed, for example, twenty times as high as the normal 3 tape speed, or a search in the rewind mode).

Also in this embodiment, track number data are sequentially added to video data recorded on the respective tracks $t_1$ to $t_{228}$ as sub codes and the track number data are recorded together with the digital video signal.

If a digital video signal of a new still image is to be recorded on a video tape on which the digital video signal of one frame is already recorded on the PCM data area 53 of tracks $t_1$ to $t_{228}$, then the video signal of one frame picked-up by the CCD imager 1 is temporarily stored in the frame memory 32 and then the end point ID recorded together with the digital video signal on the tracks $t_{209}$ to $t_{228}$ is searched for in the high speed search.

In this case, if the track scanned, for example, by the magnetic head in the camera mode is the track (i.e., any one of the tracks $t_1$ to $t_{228}$) in which the data is already recorded on its PCM data area 53, the end point ID is searched for by a fast forward search. If the above track scanned is the track (i.e., track after the track $t_{229}$) in which data is not recorded on the PCM data area 53, the end point ID is searched for by a rewind search.

On the basis of the detection of this end point ID, the track $t_{229}$ next to the last still image recording track $t_{228}$ is scanned by the magnetic head to thereby record a video signal of one new frame stored in the frame memory 32 over 228 tracks from the above track $t_{229}$.

Further, ID signals such as the start point ID, the end point ID or the like and sub code information such as the track number data or the like included in the reproduced data are supplied from the serial-to-parallel converting circuit 34 to the memory controller 33, whereby various controls such as the control of the reproducing track or the like can be performed by the memory controller 33 on the basis of the sub code information.

In this embodiment, the end point ID is recorded on the last 20 tracks from $t_{211}$ to $t_{230}$ as described above so that, when only the still image is recorded, the starting track $t_{231}$ of the recorded track in which the still image is not recorded can be searched for with ease. Thus, by recording the next still image from the above track $t_{231}$, the digital video signal of the still image can be successively recorded on the tracks formed on the video tape.

In accordance with this embodiment, since the non-recorded track can be detected with ease by utilizing the end point ID, the digital video signal of the still image can be successively recorded effectively and efficiently. Also, a new digital video signal can be prevented from being unintentionally recorded on a track in which a digital video signal of the still image is already recorded, thus avoiding unintentional erasure. Further, since the still images are successively recorded as described above, upon reproduction, the recorded still images can be successively searched for by reproducing the tape from the tape starting end, thus making it possible to efficiently reproduce the still images.

Further, while the last track is determined on the basis of the end point ID as described above in the second embodiment, the last track may be determined by detecting the track number data recorded on each track together with the digital video signal of the still image. In the high speed search mode, the last track can be detected more easily by using the ID signal rather than using the track number data.

According to the second embodiment of the present invention, the video signal of the still image can be simultaneously recorded with the video signal provided as the real moving picture and the non-recorded portion of the still image recording area can be detected with ease in the search mode or the like. Thus, the still image signal can be effectively recorded on the record medium and therefore the recording of the still image can be efficiently done by this simple arrangement.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A video signal recording apparatus, comprising: means for providing still image data representing a respective high resolution still image; memory means for storing said still image data for at least two said high resolution still images and which are sequentially derived from said means for providing still image data at arbitrary times; memory control means for controlling read out of said stored still image data from said memory means; and means for sequentially digitally recording on a record medium the still image data read out from said memory means for said at least two high resolution still images.

2. A video signal recording apparatus according to claim 1, further comprising means for providing an analog video signal corresponding to said still image data and means for converting said analog video signal to a digital video signal and for supplying said digital video signal to said memory means.

3. A video signal recording apparatus according to claim 2, further comprising still image recording switch means for selecting a portion of said digital video signal to be stored in said memory means.

4. A video signal recording apparatus according to claim 2, further comprising: bit reduction means for compressing said digital video signal into a compressed digital signal having a reduced number of bits.

5. A video signal recording apparatus according to claim 1, wherein said memory means is a frame memory having a capacity sufficient to store three frames of a video signal.

6. A video signal recording apparatus according to claim 1, wherein said record medium has tracks each including a video signal area used for recording one field of a standard resolution video signal and a PCM data area used for recording a portion of one field of a high resolution video signal and wherein said means for sequentially recording records said still image data read out from said memory means in said PCM data area and records still image data from said means for providing still image data as a standard resolution video signal in said video signal area when said memory means is fully occupied.

7. A video signal recording apparatus according to claim 1, wherein said means for sequentially recording records said still image data in tracks on said recording medium, each of said tracks containing a plurality of PCM data segments.

8. A video signal recording apparatus according to claim 1; in which a field of a standard resolution video signal is recorded in a first portion of each of successive tracks on said record medium, said still image data for each of said still images is recorded in respective second portions of a group of said tracks, and identification signals indicating tracks adjacent an end of the group are also recorded in selected tracks in the group; and wherein said means for sequentially recording records still image data for a new still image beginning in a track devoid of a still image and located subsequent to a track containing said identification signals identifying the end of the group of tracks in which still image data is recorded.

9. A video signal recording apparatus according to claim 1; wherein said means for providing still image data includes image pick-up means for receiving light representing each said respective high resolution still image.

10. A video signal recording apparatus according to claim 9, wherein said image pick-up means is a charge coupled device providing a full-pixel readout.

11. A video signal recording apparatus according to claim 6, wherein said means for sequentially recording records identification data in said PCM data area when said still image data is recorded in said video signal area.

12. A video signal recording apparatus according to claim 7, wherein said means for sequentially recording records still image data for the same high resolution still image in the PCM data segments in a track.

13. A video signal recording apparatus according to claim 7, wherein said means for sequentially recording records still image data for different high resolution still images in each PCM data segment of a track.

14. A video signal recording apparatus according to claim 8, wherein said means for sequentially recording also records track number data on each track together with said still image data for identifying said end of each of said groups of tracks.

15. A video signal recording apparatus according to claim 8, wherein said still image data represents one frame of a high resolution video signal and each said group in which said still image data for each of said high resolution still images is recorded contains 228 tracks.

16. A video signal recording apparatus according to claim 15, wherein said identification signals are recorded in the last 20 tracks of each said group of said tracks.

* * * * *